(12) United States Patent (10) Patent No.: US 8,510,858 B2
Lee (45) Date of Patent: Aug. 13, 2013

(54) MULTI-FUNCTIONAL DEVICE AND METHOD OF STORING A TRANSMISSION LIST OF USERS IN THE SAME

(75) Inventor: Hyun-suk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1164 days.

(21) Appl. No.: 11/422,697

(22) Filed: Jun. 7, 2006

(65) Prior Publication Data

US 2006/0282673 A1 Dec. 14, 2006

(30) Foreign Application Priority Data

Jun. 8, 2005 (KR) ........................ 10-2005-0048839

(51) Int. Cl.
*G06F 17/30* (2006.01)
(52) U.S. Cl.
USPC .................................. 726/29; 726/28; 726/27
(58) Field of Classification Search
USPC ..................... 713/170, 176, 182–185; 726/2, 726/3, 5, 6, 27–30; 380/243, 246, 55; 358/1.15, 448, 440, 1.13, 1.16, 400, 401, 358/405, 426.02; 709/206, 203, 213, 216, 709/245, 219, 227
See application file for complete search history.

(56) References Cited

U.S. PATENT DOCUMENTS

| 5,974,448 A | 10/1999 | Yamauchi et al. |
| 6,157,706 A | 12/2000 | Rachelson |
| 6,437,875 B1 * | 8/2002 | Unno ........................... 358/1.16 |
| 6,694,353 B2 * | 2/2004 | Sommerer ..................... 709/206 |
| 6,931,432 B1 * | 8/2005 | Yoshida ........................ 709/206 |

(Continued)

FOREIGN PATENT DOCUMENTS

| EP | 1 422 920 A2 | 5/2004 |
| JP | 10-164345 | 6/1998 |

(Continued)

OTHER PUBLICATIONS

European Examination Report dated Sep. 28, 2006 issued in EP 6115104.9.

(Continued)

*Primary Examiner* — Nirav B Patel
(74) *Attorney, Agent, or Firm* — Stanzione & Kim, LLP

(57) ABSTRACT

A multi-functional device and a method of storing a transmission list of users in the same. The multi-functional device includes an authenticator to authenticate one or more users, a storage unit to store a transmission list of the authenticated users, a user interface to display the transmission list of the authenticated users, a controller to read the transmission list of the authenticated users stored in the storage unit and to control the user interface to display the read list, and a communication interface to transmit and receive data. The controller controls the communication interface to transmit and receive the data to/from a transmission address, which is selected from the displayed transmission list by the user interface. When a multi-functional device is used to transmit scanned data to an electronic mail address or an Internet address, the transmission address can be selected from a recently transmitted electronic mail address list or a recently transmitted Internet address list of authenticated users such that an address desired by a user can be set up instead of directly inputting the address. Accordingly, a transmission address list of users is managed, thereby preventing the transmission address list from being discarded or deleted by other people using the multi-functional device.

17 Claims, 4 Drawing Sheets

(56) References Cited

U.S. PATENT DOCUMENTS

| | | | |
|---|---|---|---|
| 7,068,165 B2* | 6/2006 | Takahashi et al. | 340/539.26 |
| 7,130,066 B1* | 10/2006 | Kanematu | 358/1.15 |
| 7,239,434 B2* | 7/2007 | Endo | 358/474 |
| 7,389,063 B2* | 6/2008 | Tomita et al. | 399/80 |
| 7,519,302 B2* | 4/2009 | Matsuhara | 399/8 |
| 2002/0024685 A1 | 2/2002 | Sasaki et al. | |
| 2002/0024686 A1* | 2/2002 | Uchiyama et al. | 358/407 |
| 2002/0048046 A1* | 4/2002 | Unno | 358/1.16 |
| 2003/0093483 A1 | 5/2003 | Allen et al. | |
| 2004/0048621 A1* | 3/2004 | Takahashi et al. | 455/456.3 |
| 2005/0198144 A1* | 9/2005 | Kraenzel et al. | 709/206 |
| 2005/0289126 A1* | 12/2005 | Koguchi | 707/3 |

FOREIGN PATENT DOCUMENTS

| | | |
|---|---|---|
| JP | 2002-44405 | 2/2002 |
| JP | 2002-118710 | 4/2002 |
| KR | 1999-0070446 | 9/1999 |
| KR | 2004-33176 | 4/2004 |

OTHER PUBLICATIONS

Korean Office Action dated Sep. 27, 2006 issued in KR 2005-48839.

Notice of Allowance issued in Korean Patent Application No. 10-2005-0048839 on Jul. 12, 2007.

* cited by examiner

MULTI-FUNCTIONAL DEVICE AND METHOD OF STORING A TRANSMISSION LIST OF USERS IN THE SAME

CROSS-REFERENCE TO RELATED APPLICATIONS

This application claims the benefit of Korean Patent Application No. 10-2005-0048839, filed on Jun. 8, 2005 in the Korean Intellectual Property Office, the disclosure of which is incorporated herein in its entirety by reference.

BACKGROUND OF THE INVENTION

1. Field of the Invention

The present general inventive concept relates to a method of storing a transmission list of users in a multi-functional device, and more particularly, to a method of selecting a transmission address from a recently transmitted address list of users authenticated by a multi-functional device and storing transmitted addresses in the transmission list.

2. Description of the Related Art

FIG. 1 is a flowchart of a method of transmitting a document scanned by a conventional multi-functional device using electronic mail or a network. Referring to FIG. 1, a recently transmitted address list is selected so as to transmit the document scanned by the multi-functional device (Operation 100). If a transmission address is an electronic mail address (Operation 110), a recently transmitted electronic mail list is browsed (Operation 120). If the transmission address is an Internet address (Operation 110), a recently transmitted Internet address list is browsed (Operation 130). The browsed list is displayed on a screen (Operation 140). A user selects a transmission address from the list displayed on the screen (Operation 150). If the user selects no transmission address (Operation 160), Operations 110 through 150 are repeatedly performed. If the user selects all the transmission addresses (Operation 160), the document is scanned (Operation 170), and the scanned document is transmitted to the selected addresses (Operation 180). After completing the transmission of the scanned document, the addresses to which the scanned document is transmitted are again stored in the recently transmitted address list (Operation 190).

However, any user can delete or modify the recently transmitted address list of the multi-functional device. This can cause other users of the multi-functional device an inconvenience when the other users are searching for particular addresses.

Additionally, any unauthorized user of the multi-functional device can control the device to transmit the scanned document to any Internet address or electronic mail address. This can become a problem, when, for example, the multi-functional device is typically used to scan confidential documents.

SUMMARY OF THE INVENTION

The present general inventive concept provides an apparatus and method of displaying a recently transmitted electronic mail address list or an Internet address list of authenticated users and selecting a transmission address from the list when data scanned by a multi-functional device are transmitted to an electronic mail address or an Internet address. Accordingly, a transmission address list may be prevented from being discarded, deleted, or modified by other people using the multi-functional device.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a multi-functional device, the apparatus including an authenticator to authenticate one or more users, a storage unit to store a transmission list of the authenticated users, a user interface to display the transmission list of the authenticated users, a controller to read the transmission list of the authenticated users stored in the storage unit and to control the user interface to display the read list, and a communication interface to transmit and receive data. The controller controls the communication interface to transmit and receive the data to/from a transmission address, which is selected from the displayed transmission list by the user interface.

The foregoing and/or other aspects of the present general inventive concept are also achieved by providing a multi-functional device that scans image data, including an authentication module to authenticate at least one user, a control module to enable the at least one authenticated user to transmit the image data to at least one network address, and a storage module to manage at least one transmission address list including the at least one network address.

The foregoing and/or other aspects of the present general inventive concept are also achieved by providing a multi-functional device, including a scanner module to obtain image data from a document, and a control module to manage a first list of users authenticated in the device and at least one second list of recently transmitted addresses to which the scanned image data is transmitted.

The foregoing and/or other aspects of the present general inventive concept are also achieved by providing a user interface of a multi-functional device, the interface including an authentication portion to authenticate a user in the device, and a recently transmitted selection portion to enable the authenticated user to select one or more target addresses from a plurality of recently transmitted addresses in a list to which image data has been transmitted.

The foregoing and/or other aspects of the present general inventive concept are also achieved by providing a method of managing network addresses in a multi-functional device that scans image data, the method including authenticating at least one user, enabling the at least one authenticated user to transmit the scanned image data from the multi-functional device to at least one network address, and maintaining at least one transmission address list including the at least one network address.

The foregoing and/or other aspects of the present general inventive concept are also achieved by providing a method of managing a multi-functional device, the method including scanning image data from a document, and maintaining a first list of users authenticated in the device and at least one second list of recently transmitted addresses to which the scanned image data has been transmitted.

The foregoing and/or other aspects of the present general inventive concept are also achieved by providing a method of managing a multi-functional device, the method including managing history information of a predetermined class of users of the device, and enabling the predetermined class of users to access the history information and to transmit scanned image data to one or more target network addresses based on the accessed history information.

The foregoing and/or other aspects of the present general inventive concept are also achieved by providing a method of storing a transmission address list of users in a multi-functional device, the method including authenticating one or more users, browsing a recently transmitted address list of the authenticated users, selecting a transmission address from the list, and transmitting scanned data to the selected transmission address.

BRIEF DESCRIPTION OF THE DRAWINGS

These and/or other aspects of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
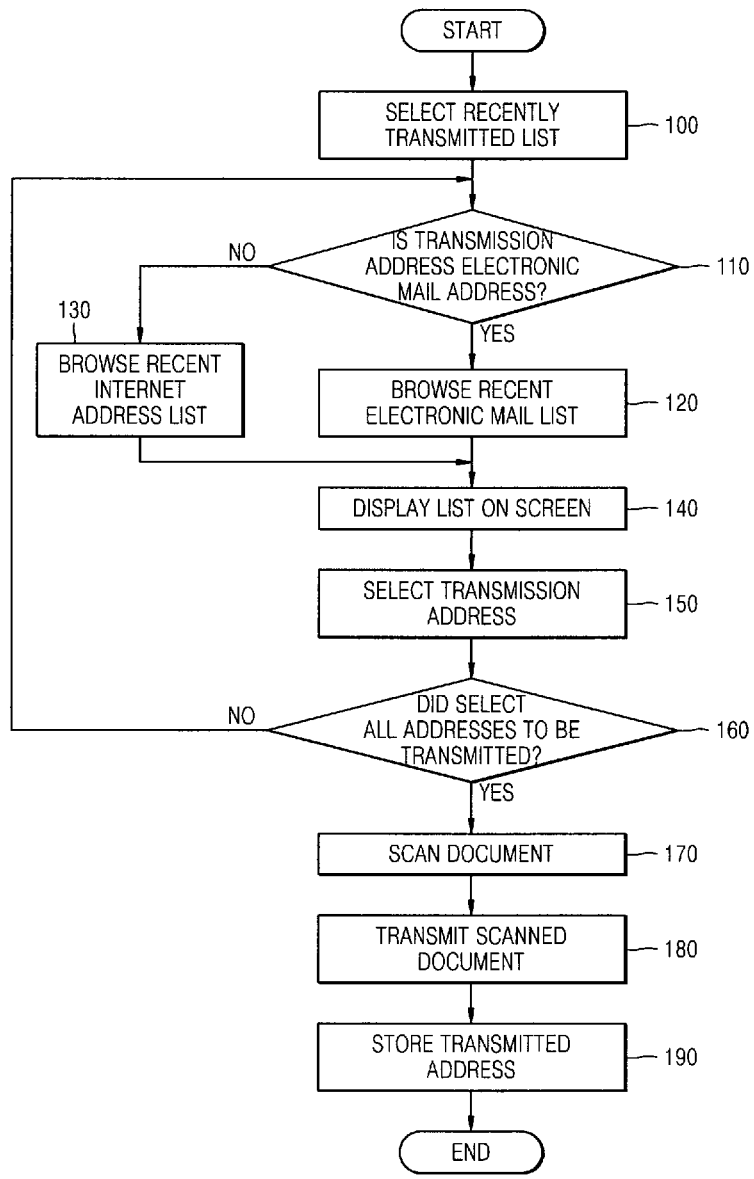
FIG. 1 is a flowchart illustrating a method of transmitting a document scanned by a conventional multi-functional device using electronic mail or a network.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
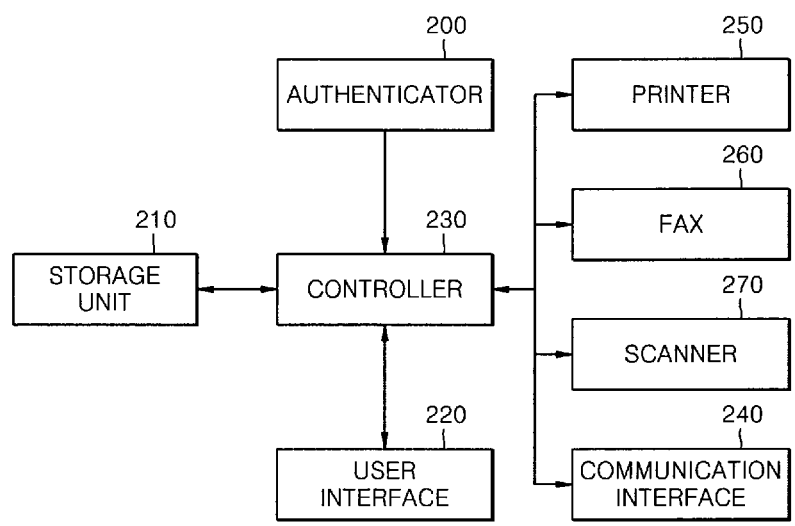
FIG. 2 is a block diagram illustrating a multi-functional device according to an embodiment of the present general inventive concept.

FIG. 2 is a block diagram of a multi-functional device according to an embodiment of the present general inventive concept. Referring to FIG. 2, the multi-functional device includes an authenticator 200, a storage unit 210, a user interface 220, a controller 230, a communication interface 240, a printer 250, a fax 260, and a scanner 270.

The authenticator 200 authenticates users who use the multi-functional device based on IDs and passwords registered in the multi-functional device.

The storage unit 210 stores a transmission address list of the authenticated users and temporarily stores data scanned by the scanner 270. The transmission address list of the authenticated users is stored as an electronic mail address list of users or an Internet address list of users according to a transmission address type. The users can be authenticated by the multi-functional device in a variety of different manners. In one example, the multi-functional device can authenticate all users in a predetermined class when the multi-functional is first installed and/or initialized. This may occur when the multi-functional device is installed in a secure network (e.g., in an office). In this case, the IDs and passwords can be registered automatically via the network, or can be entered at a user terminal when the user is prompted. In another example, the users can be authenticated when each authorized user uses the multi-functional device. In this case, each user may register their respective ID and password when the user first uses the device.

The user interface 220 displays the transmission address list of the authenticated users. The displayed transmission address list of the authenticated users is a recent electronic mail list of the authenticated users or a recent Internet address list of the authenticated users. Also, a transmission address can be selected from the displayed transmission address list of the authenticated users displayed in the user interface 220. If the displayed transmission address list of the authenticated users has no transmission address (or does not include a target transmission address), the target transmission address can be input via the user interface 220. If the target transmission address is selected from the displayed transmission address list of the authenticated users via the user interface 220 and/or if the target transmission address is directly input, several addresses at a time can be selected as target addresses.

The controller 230 reads the transmission address list of the authenticated users stored in the storage unit 210 and controls the user interface 220 to display the transmission address list. Also, if the user interface 220 selects the target transmission address from the displayed transmission address list of the authenticated users, the controller 230 controls the communication interface 240 to transmit/receive data to/from the selected target address. After the communication interface 240 transmits the data to the selected target address, the controller 230 controls the storage unit 210 to store the target address in the transmission address list. If the storage unit 210 stores a previous data transmission address list of the authenticated users, the controller 230 controls the storage unit 210 to update the target address to which the data is recently transmitted to a recently transmitted address. If the storage unit 210 stores no previous data transmission address list of the authenticated users, the controller 230 controls the storage unit 210 to create a transmission address list of the user and store the target address to which the data is recently transmitted as a recently transmitted address in the newly created transmission address list. The transmission address list may be a transmission history, which may include target addresses. The target addresses may be associated with users.

The controller 230 can control the storage unit 210 to store recently transmitted addresses in an order in which the addresses have been used, beginning with the most recent transmission address.

The controller 230 may also control the storage unit 210 to store a first list as the list of the authenticated users and a second list as the recently transmitted address list. For example, when the data is transmitted to the target address, which is not present in the second recently transmitted address list, the controller 230 controls the storage unit 210 to update the second recently transmitted address list to include the target address. The second recently transmitted address list of recent transmission addresses may include addresses that correspond to a subset of the authenticated users in the first list.

Additionally, the controller 230 may control the storage unit 210 to store a plurality of transmission address lists associated with each of the authenticated users in the list of authenticated users (i.e., the first list). In this case, a user can authenticate using the corresponding ID and password via the user interface 220. In response to the authentication of the user, the controller 230 may control the user interface 220 to display a recently transmitted address list associated with the particular user that is currently using the multi-functional device.

In another embodiment of the general inventive concept, users may be temporarily authenticated as temporary users (e.g., a guest user), for example, when the multi-functional device is not used to transmit data that is confidential or sensitive information. In this case, the controller 230 may not store recently transmitted addresses to which the guest user transmits data. Alternatively, the controller 230 may control the storage unit 210 to store a recently transmitted list associated with all guest users.

The communication interface 240 transmits/receives data.

The printer 250 prints the data transmitted to the multi-functional device.

The fax 260 transmits data received by the communication interface 240 to the printer 250, or the data scanned by the scanner 270 via the communication interface 240.

The scanner 270 scans a document and stores the scanned data in the storage unit 210.

Figure 3:
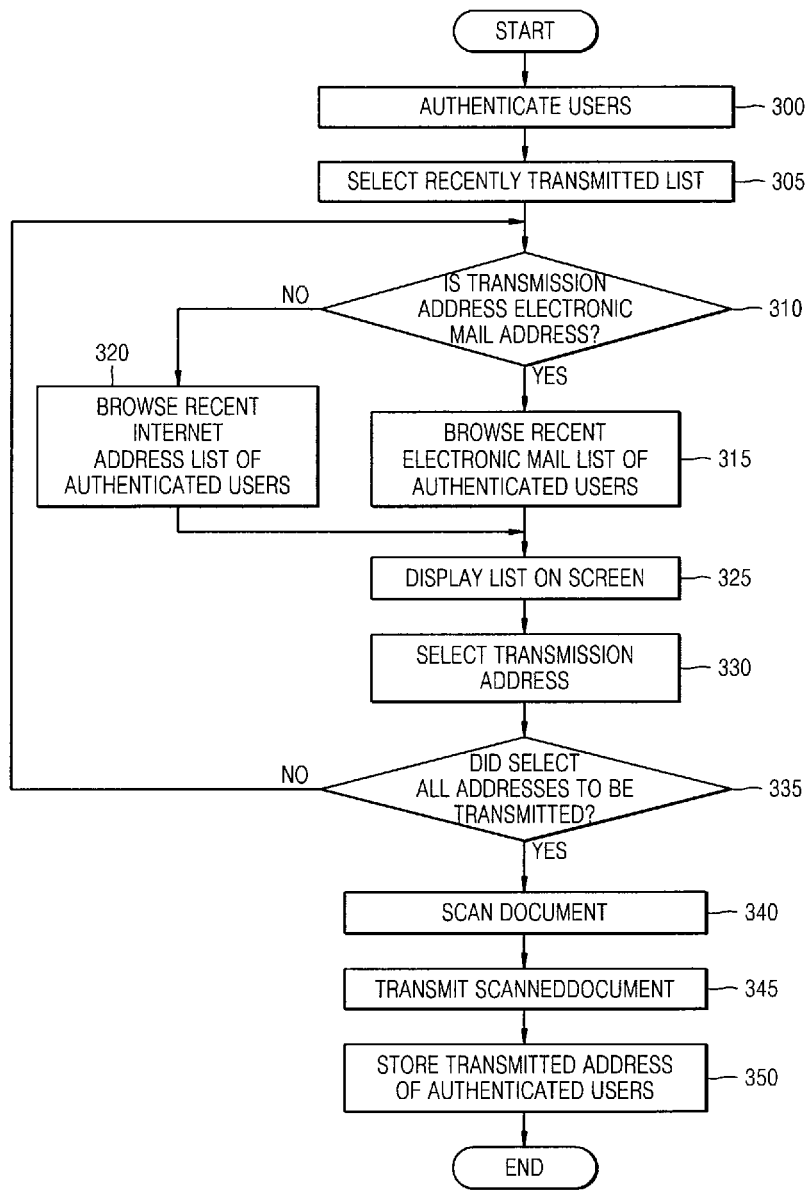
FIG. 3 is a flowchart illustrating a method of storing a transmission list of users in the multi-functional device of FIG. 2, according to an embodiment of the present general inventive concept.

FIG. 3 is a flowchart illustrating a method of storing the transmission list of users in the multi-functional device of FIG. 2. The method of FIG. 3 can be performed by the multi-functional device of FIG. 2. Accordingly, for illustration purposes, the method will now be described with reference to FIG. 2.

Referring to FIGS. 2 and 3, when the multi-functional device transmits a scanned document, users are authenticated by the authenticator 200 (Operation 300). After the authentication process, a recently transmitted list is selected in order to transmit the scanned document by the multi-functional device (Operation 305). That is, in the Operation 305, a user that operates the multi-functional device can be authenticated using, for example, the corresponding ID and password. As described above, other authentication processes may also be used. If a transmission address is an electronic mail address (Operation 310), the controller 230 controls the user interface 220 to browse a recently transmitted electronic mail list (Operation 315). If the transmission address is an Internet address, the controller 230 controls the user interface 220 to browse a recently transmitted Internet address list (Operation 320). After browsing the recently transmitted electronic mail list or the recently transmitted Internet address list, the controller 230 controls the user interface 220 to display the appropriate recently transmitted list (Operation 325). The user can select the target transmission address from the appropriate recently transmitted list displayed by the user interface 220 (Operation 330). If the user does not select any target transmission address (Operation 335), Operations 310 through 330 can be repeatedly performed. If the user selects all the transmission addresses in the appropriate recently transmitted list as target addresses (Operation 335), the scanner 270 scans the document (Operation 340) and the controller 230 transmits the scanned document to the selected target addresses via the communication interface 240 (Operation 345). After completing the transmission, the target transmission addresses are stored (or updated) in the recently transmitted list stored in the storage unit 210 (Operation 350). Accordingly, the target transmission addresses to which the authenticated users transmit data are stored in the recently transmitted list in the storage unit 210.

Figure 4:
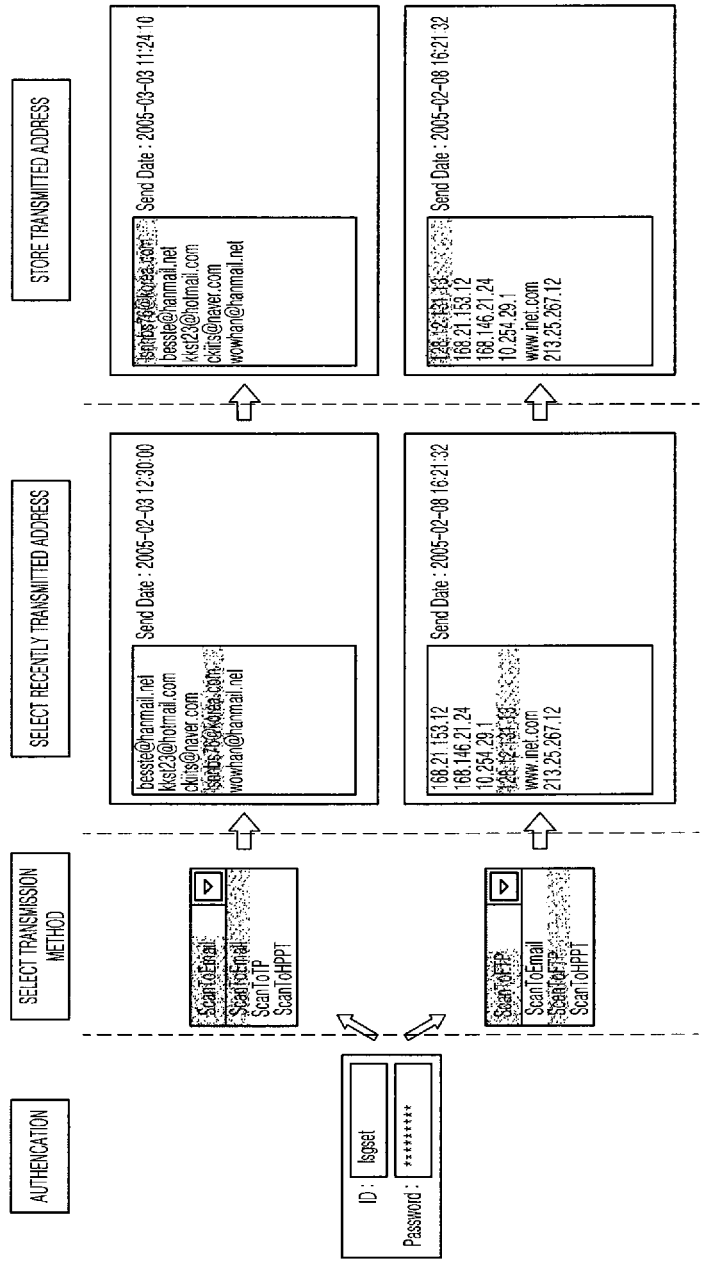
FIG. 4 illustrates operations performed via a user interface of the multi-functional device of FIG. 2, according to an embodiment of the present general inventive concept.

FIG. 4 illustrates operations performed via the user interface 220 of FIG. 2, according to an embodiment of the present general inventive concept. Referring to FIG. 4, in the Operation 300 of the method of FIG. 3, users are authenticated using user IDs and/or user passwords. For example, the user interface 220 of FIG. 4 may include a login portion (i.e., authentication portion), a transmission method selection portion, a recently transmitted address selection portion, etc.

In the Operation 310 of selecting a transmission method of the method of FIG. 3, a screen is provided to select the method of transmitting scanned data to an electronic mail address, an FTP address, or an HTTP address.

In the Operation 330 of selecting a recently transmitted address of the method of FIG. 3, a target transmission address is selected from a recent transmission address list which is an electronic mail list or a FTP address list provided to the user interface 220.

In the Operation 350 of storing a target transmission address of the method of FIG. 3, the transmitted electronic mail address or FTP address is displayed on a screen as a recently transmitted address.

The general inventive concept can also be embodied as computer readable code on a computer readable recording medium. The computer readable recording medium can be any data storage device that can store data, which can be thereafter read by a computer system. Examples of the computer readable recording medium include read-only memory (ROM), random-access memory (RAM), CD-ROMs, magnetic tapes, floppy disks, optical data storage devices, and web servers. The computer recording media may transmit stored data via electrical signals, light signals, or carrier waves (such as data transmission through the internet).

As described above, when a multi-functional device is used to transmit scanned data to an electronic mail address or an Internet address, a transmission address is selected from a recently transmitted electronic mail address list or a recently transmitted Internet address list of authenticated users such that an address desired by a user can be set up instead of directly inputting the address. Accordingly, a transmission address list of users can be managed, thereby preventing the transmission address list from being discarded, deleted, or modified by other people using the multi-functional device.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-functional device, comprising:
   a scanner to scan image data;
   an authentication module to authenticate a plurality of users including at least one first user as an at least one authenticated user and at least one guest user as a temporary authenticated user;
   a user interface module to display a list of recently transmitted network addresses that corresponds to an active at least one authenticated user from among the plurality of authenticated users and that is selected from among transmission lists corresponding to the plurality of authenticated users while excluding the display of a list of recently transmitted network addresses that corresponds to the guest user;
   a control module to enable the at least one authenticated user and the at least one guest user to transmit the image data to at least one network address; and
   a storage module to store and manage the list of recently transmitted network addresses to which data has recently been transmitted by the plurality of authenticated users in a transmission address list of the plurality of authenticated users while excluding the storage of recently transmitted network addresses to which data has recently been transmitted by the at least one guest user when the at least one authenticated user is the active authenticated user and when the at least one guest user is an active temporary authenticated user, wherein the storage module stores and manages lists of the recently transmitted network addresses corresponding to the plurality of authenticated users.

2. The device of claim 1, further comprising:
   a user interface module to display a login window to authenticate the user using at least one of an ID and a password.

3. The device of claim 1, wherein the at least one network address comprises one or more of an email address, an Internet address, an Internet Protocol address, and a File Transfer Protocol address.

4. The device of claim 1, wherein the user interface module enables the at least one authenticated user to select from among a plurality of network address types and to display a list of recently transmitted network addresses that corresponds to the selected network address type.

5. The device of claim 1, wherein the storage module stores a plurality of network addresses in the at least one transmission address list in an order beginning with a most recent network address to which the image data is transmitted.

6. The device of claim 1, wherein the control module updates the at least one transmission address list including the at least one network address each time the at least one authenticated user transmits the image data.

7. The device of claim 1, further comprising:
a user interface module to enable the at least one authenticated user to add a network address to the stored at least one transmission address list.

8. The device of claim 1, further comprising:
a printer to print the image data;
a fax to transmit the image data over a network to another fax; and
a communication interface to transmit the image data to the at least one network address.

9. The device of claim 1, further comprising:
a scanner module including the scanner to scan a document to obtain the image data; and
a user interface module to enable the at least one authenticated user to browse the at least one transmission address list to select at least one target address to which the image data is to be transmitted.

10. The device of claim 1, wherein the storage module manages the at least one transmission address list by creating, storing, and/or updating the at least one transmission address list.

11. A multi-functional device having a user interface comprising:
an authentication portion to authenticate a plurality of users including at least a first user in the device as an authenticated user and at least one guest user as a temporary authenticated user;
a recently transmitted selection portion to enable an active authenticated user from among the plurality of authenticated users to select one or more target addresses from a plurality of recently transmitted addresses in a list to which image data has been transmitted by the plurality of authenticated users while preventing the active authenticated user from selecting any target addresses to which image data has been transmitted by the at least one guest user when the first user is the active authenticated user, and while preventing the at least one guest user from selecting any target addresses to which image data has been transmitted by the at least one guest user when the at least one guest user is an active temporary authenticated user;
a display device to display a list of recently transmitted network addresses that corresponds to the selected network address type when the plurality of users are authenticated while preventing the authenticated user from selecting any target addresses to which image data has been transmitted by the at least one guest user when the authenticated user is the active authenticated user, and while preventing the at least one guest user from selecting any target addresses to which image data has been transmitted by the at least one guest user when the at least one guest user is an active temporary authenticated user, wherein the list of recently transmitted network addresses to which data has been transmitted by the plurality of authenticated users does not include addresses to which only the at least one guest user has transmitted image data; and
a storage unit to store and manage the list of recently transmitted network addresses to which data has recently been transmitted by the plurality of authenticated users in a transmission address list of the plurality of authenticated users while excluding the storage of recently transmitted network addresses to which data has recently been transmitted by the at least one guest user when the at least one authenticated user is the active authenticated user and when the at least one guest user is an active temporary authenticated user, wherein the storage unit stores and manages lists of the recently transmitted network addresses corresponding to the plurality of authenticated users.

12. The interface of claim 11, further comprising:
a transmission method selection portion to enable the authenticated user to select a transmission method to be used to transmit the image data to the one or more of the selected target addresses.

13. A method of managing network addresses in a multi-functional device that scans image data, the method comprising:
authenticating a plurality of users including a first user as an authenticated user and a guest user as a temporary authenticated user;
displaying a list of recently transmitted network addresses that corresponds to a selected network address type, where the display of the list of the recently transmitted network addresses corresponds to one authenticated user from the plurality of authenticated users while excluding the display of a list of recently transmitted network addresses that corresponds to the guest user;
selecting at least one network address from the list;
scanning image data from a document;
transmitting the scanned image data to the at least one selected network address; and
storing at least one transmission address list including the at least one network address when the first user is an active authenticated user while excluding the storage of a transmission address list including the at least one network address when the guest user is an active temporary authenticated user, wherein the transmission address list includes addresses to which data has recently been transmitted by the plurality of authenticated users, and the transmission address list to which data has been transmitted by the plurality of authenticated users does not include addresses to which data has recently been transmitted by the guest user.

14. The method of claim 13, wherein the transmission address is directly input if the browsed transmission list contains no transmission address.

15. The method of claim 13, further comprising:
updating the transmission address to a recently transmitted address if there is a previous data transmission address list of the authenticated users.

16. The method of claim 13, further comprising:
creating a transmission address list of a user; and
storing the transmission address as the recently transmitted address if there is a previous data transmission address list of the authenticated users.

17. A non-transitory computer readable recording medium having embodied thereon a computer program to execute a method of storing a transmission address list of users in a multi-functional device, the medium comprising:

an executable code to authenticate a plurality of users including a first user as an authenticated user and a guest user as a temporary authenticated user;

an executable code to display a list of recently transmitted network addresses that corresponds to a selected network address type, the list not including recently transmitted network addresses of the guest user when the authenticated user is an active authenticated user and when the guest user is an active temporary authenticated user;

an executable code to select at least one network address from the list;

an executable code to scan an image data from a document;

an executable code to transmit scanned image data to the at least one selected network address; and an executable code to store at least one transmission address list including the at least one network address when the first user is the active authenticated user while excluding the storage of a transmission address list including the at least one network address when the guest user is the active temporary authenticated user, the transmission list comprising addresses to which data has recently been transmitted by the plurality of authenticated users, wherein the recent at least one transmission address list does not include addresses to which data has been recently transmitted by the guest user.

\* \* \* \* \*